United States Patent [19]

Svensson

[11] 4,173,176
[45] Nov. 6, 1979

[54] DEVICE FOR TRANSFER OF AIR IN ONE OR THE OTHER DIRECTION BETWEEN TWO PLACES

[76] Inventor: Eric Svensson, Box 465, 801 06 Gävle, Sweden

[21] Appl. No.: 866,415

[22] Filed: Jan. 3, 1978

[30] Foreign Application Priority Data

Jan. 10, 1977 [SE] Sweden ............................. 7700177

[51] Int. Cl.² ............................................. F23J 15/00
[52] U.S. Cl. .............................. 98/115 VM; 137/580; 202/263
[58] Field of Search ..................... 98/115 R, 115 VM; 202/263; 266/158, 159; 104/52; 137/580

[56] References Cited

U.S. PATENT DOCUMENTS 3,874,803   4/1975   Svensson ......................... 98/115 VM
3,913,470   10/1975  Cullen ............................. 98/115 VM

FOREIGN PATENT DOCUMENTS 420486   8/1974   U.S.S.R. .............................. 98/115 VM
421551   8/1974   U.S.S.R. .............................. 98/115 VM

Primary Examiner—Ronald C. Capossela
Attorney, Agent, or Firm—Strauch, Nolan, Neale, Nies & Kurz

[57] ABSTRACT

A device for transfer of fresh air or air mixed with gases, vapors, smaller particles etc. in one or other direction between a stationary place and a moving place. A stationary elongated box is in communication with the stationary place and has a slot in its longitudinal direction and said slot closeable by a tightening band bearing on contact surfaces at each side of the slot and on the outside of the box. A hollow connection body projects through and is movable along said slot and is in communication with the moving place. Said connection body is provided with slide shoe or shoes in the slot and carries a press roller at each end of the slide shoe or at each slide shoe pressing the band against said contact surfaces and backing rollers lifting the band from engagement with the contact surfaces.

7 Claims, 10 Drawing Figures

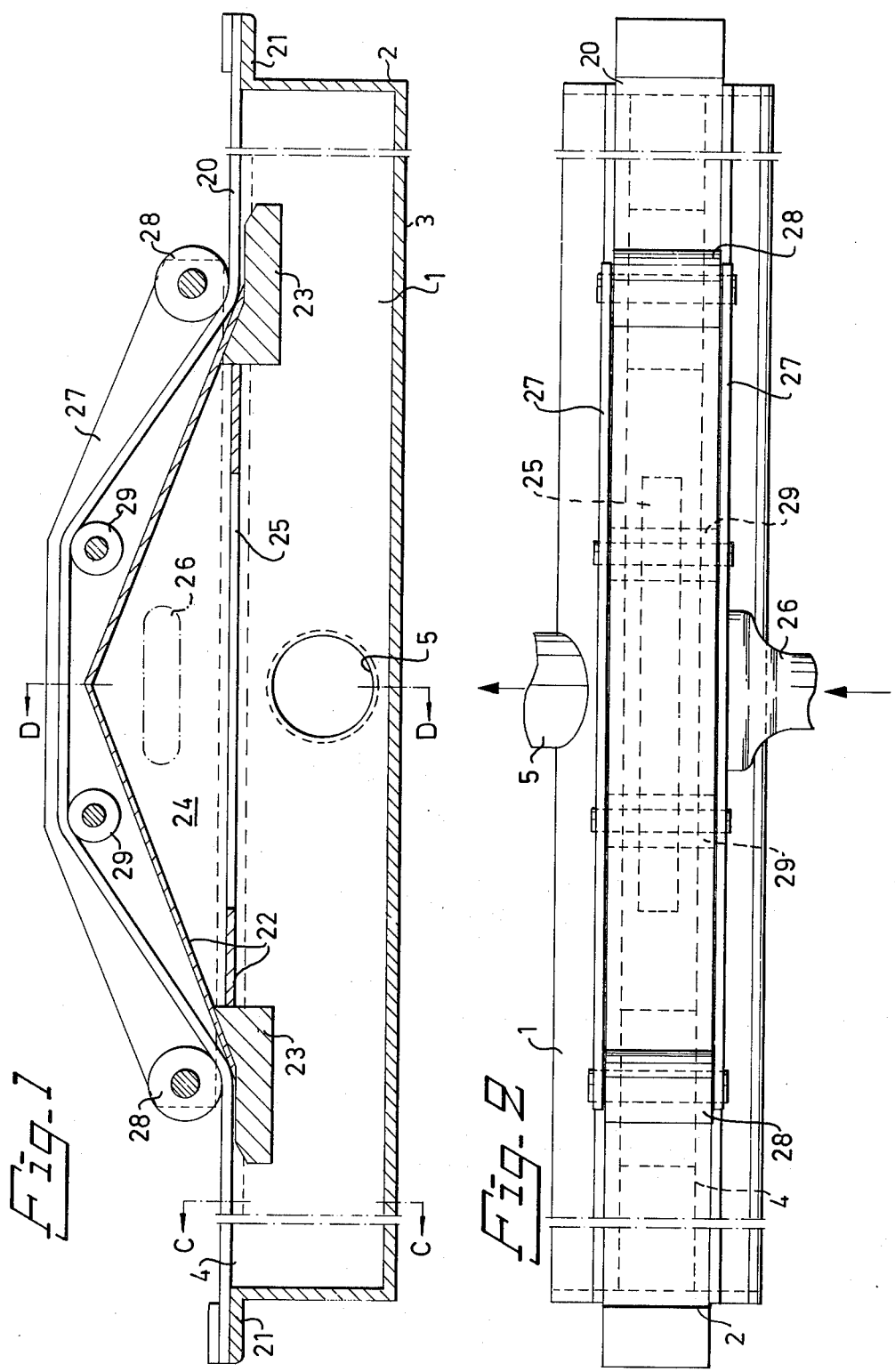

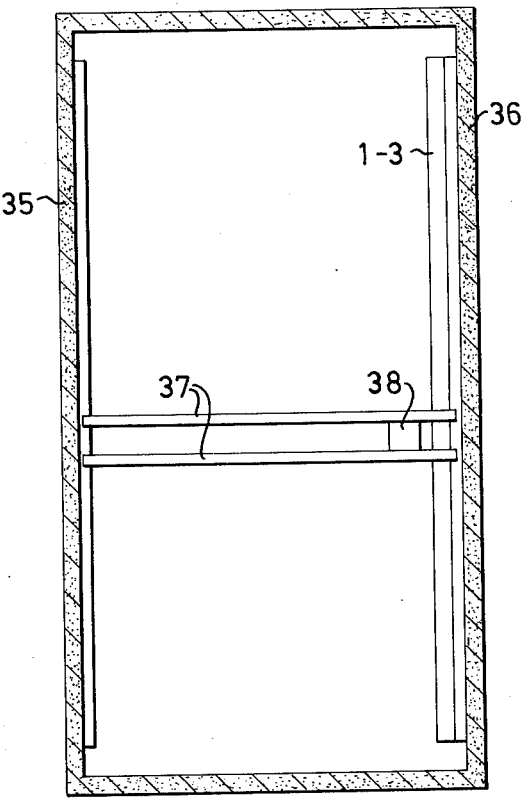
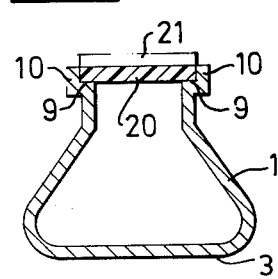
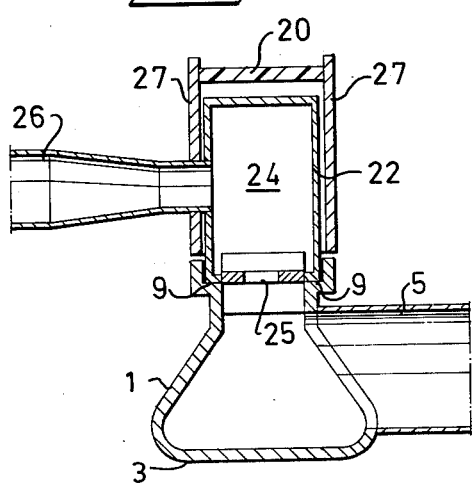

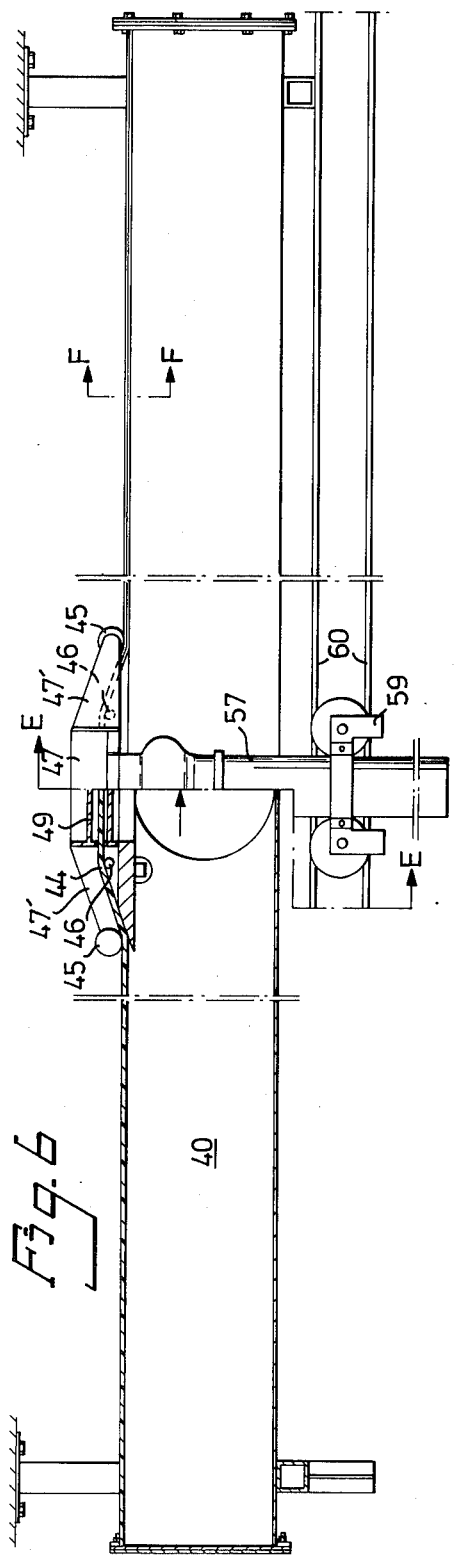
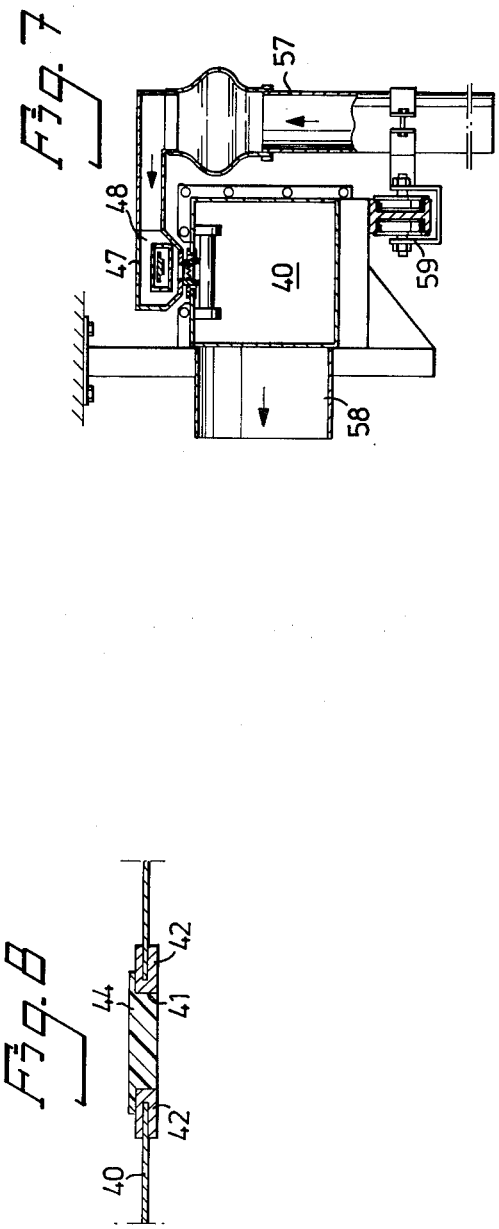

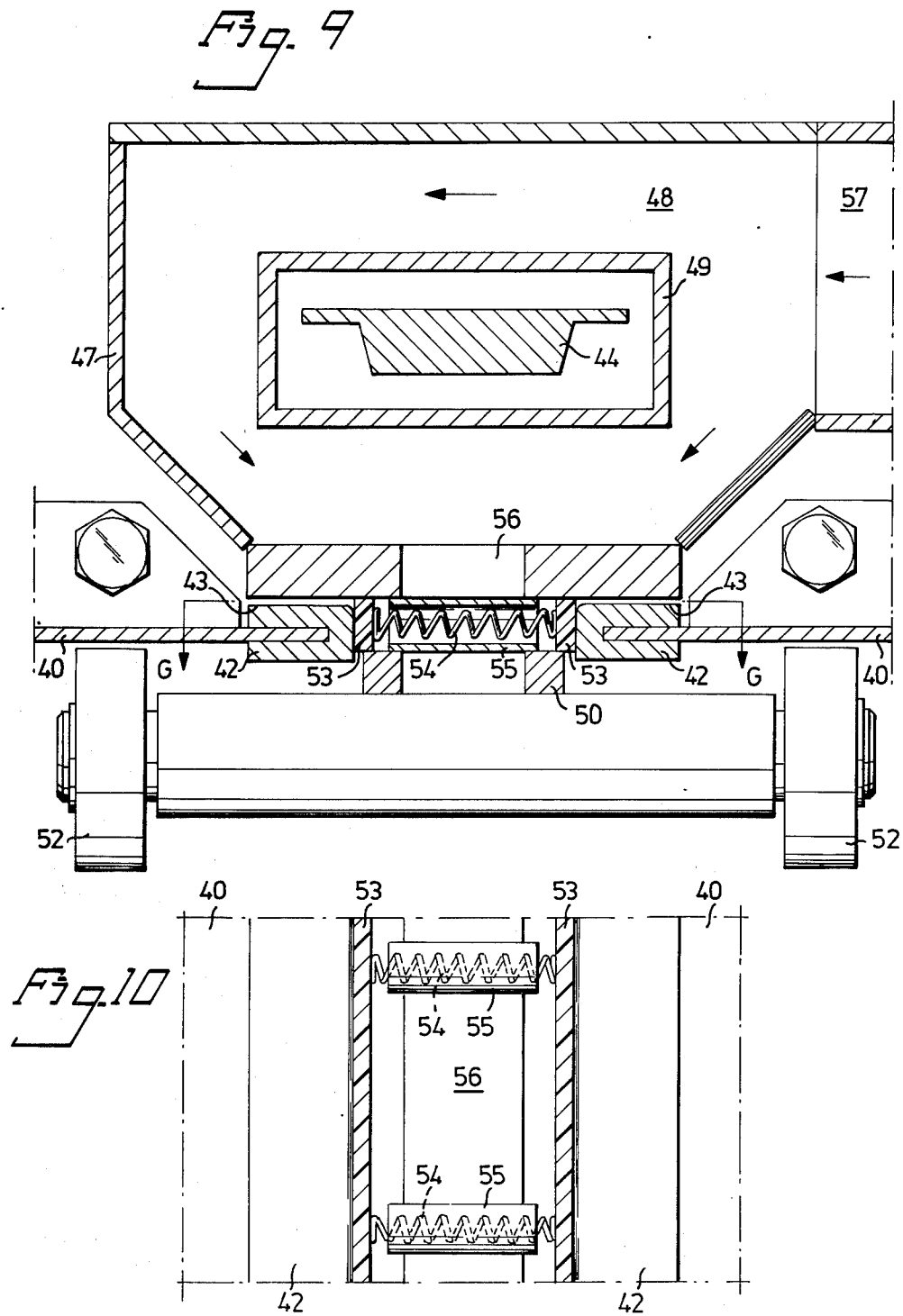

DEVICE FOR TRANSFER OF AIR IN ONE OR THE OTHER DIRECTION BETWEEN TWO PLACES

BACKGROUND OF THE INVENTION

This invention refers to a device for transfer of air mixed with gases, vapours, smaller particles etc. or of fresh air in the one or other direction between a stationary place and an intake or exhaust place in moving.

In the industry of the date there is a higher and higher demand for sound environment and then especially for the air at a working place. Therefore, directly at those working places as at welding or grinding machines, lathes, painting apparatuses etc. where gases, vapours, more or less solid small particles etc. are set free, exhaustion of the air is arranged or if the air at a working place to a certain degree is unhealthy, supply of fresh air is arranged. If then the place for generation of the gases, vapours, particles etc. during the working is moving along a larger area so called point suction is arranged at which a suction nozzle or a cap cage that by means of a flexible tube is connected to the suction source is caused to follow the generation place moving along the area. If the air at a moving working place is less healthy, supply of fresh air is arranged by means of a flexible tube with outlet at the working place. The tubes for said purpose must have a considerable length, for instance 50 meters or more, in order to permit the suction nozzle or the outlet placed at the working place to be moved along a larger area and the tubes often are not only troublesome to move, but also an obstacle and mean a risk of accident, which troublesomeness of course increases if a number of moving tubes exist at a plant.

SUMMARY OF THE INVENTION

The present invention has the task to produce a device intended for said purpose and that makes the need of such tube unnecessary and thus is not burdened with the disadvantages united therewith and which device thereto is simple and easy to mount.

This task according to the present invention is solved in such way that a device for said purpose comprises an elongated box that partly has a tube or the like connectable to a stationary inlet or outlet and partly in its longitudinal direction has a slot that is closeable by a tightening band bearing on the slot in its longitudinal direction and at which a hollow, or a passage provided, connection body is arranged on the box, so that it can be moved along the slot and have its passage in continuous communication partly with the interior of said box and partly with a pipe socket or pipe line projecting from said connection body and the free open end of said pipe socket or pipe line, during movement of the connection body, being moved to varying intake or exhaust places within an area.

The device according to the invention is characterized in that said connection body is displaceable along said slot, bearing on contact surfaces and in the slot has guided slide shoes or the like and that said connection body by means of stay plates partly supports a rotatable press roller at each slide shoe or at the ends of the slide shoe, and partly supports backing rollers at said connection body and that said tightening band has its ends fastened to attachments at the ends of said box and runs under the press rollers and over the backing rollers.

The invention is illustrated by some embodiments shown on the accompanying drawings.

FIG. 1 is a longitudinal section through the device according to the invention, at which a part near the ends of the device is cut away.

FIG. 2 is the device in FIG. 1 seen from above.

FIG. 3 is a cross section along the line C—C in FIG. 1.

FIG. 4 is a cross section along the line D—D in FIG. 1.

FIG. 5 is a schematical plan view of a factory building provided with the device according to the invention.

FIG. 6 is a longitudinal section through a modified device according to the invention.

FIG. 7 is a cross section along the line E—E in FIG. 6.

FIG. 8 is a cross section along the line F—F in FIG. 6.

FIG. 9 is a part in larger scale of the cross section in FIG. 7.

FIG. 10 is a part of the device in FIG. 9 seen along the line G—G in FIG. 9.

The device shown in the drawings, FIGS. 1–4, comprises an elongated box with side walls 1, end walls 2 and bottom 3. The box may have the cross section form shown in FIGS. 3 and 4. At the top the box is open so that a slot 4 extends between the side walls 1 and from the one end wall 2 to the other 2. In the one side wall 1 a tube 5 is connected. The box along the slot sides has a contact surface 9 and guiding border 10, FIGS. 3 and 4, for a tightening band 20 that is arranged on the box over the slot 4, and the ends of which are fastened to attachments 21 on the ends of the box. The tightening band 20 is impenetrable for air and the contact surfaces 9 and guiding borders 10 suitably are covered by a tightening material.

A connection body 22 is displaceably arranged in the slot 4 thereby that, that it bears on the contact surfaces 9, FIG. 4, and in the slot 4 has projecting slide shoes 23. The connection body 22 is provided with a passage or cavity 24 that, partly by means of a slit 25 extending over a part of the whole distance between the slide shoes, is in communication with the interior of the box, partly is open against a pipe socket 26 connected to the body 22. At each of the opposite side walls of the connection body 22 a stray plate 27 is fastened. Between the stay plates 27 two press rollers 28 and two (or more) backing rollers 29 are rotatably journalled. The tightening band 20 extends with a certain tension under the press rollers 28 and over the backing rollers 29. By that the pressure of the tightening band against the backing rollers 29 via the stay plates 27 will be transferred to the press rollers 28, which is pressing the tightening band 20 tightening against the contact surfaces 9 and against the connection body 22 with its slide shoes 23 and permits displacement of the connection body 22 along the slot 4 during running of the rollers 28,29 against the tightening band.

It is assumed that the described device shall be used for transfer of air mixed with gases, vapours, particles etc. from a place moving substantially linearly to a stationary place at which the tube 5 is connected with a stationary suction source such as the suction side of a fan. For point suction along an elongated working area, arisen for instance thereby that a machining tool of a machine is moving, the nozzle of the pipe socket 26 is applied at the slide or the like that moves said tool by which the nozzle continuously will be at the working point moving together with the machining tool. At such movement of the pipe socket 26 the connection body 22 too is moved therewith. The box 1–3, on the contrary, is stationary located for instance by being held by the pipe 5 or other holder.

When vacuum is generated in the pipe 5 and box 1–3 by means of the suction fan or the like the vacuum is transmitted through the connection body 22 and the pipe 26 to the nozzle and the working place where an effective suction is obtained even while the working place is moving. By the vaccum in the box 1–3, the tightening band 20 will be air-tight bearing on the contact surfaces 9 and harder pressure and more safe tightening as larger the vacuum is, so that air inflowing at the contact surfaces does not happen. The size of the vacuum and therewith the suction power to a certain degree is controllable by means of for instance a check valve in the pipe 26. The medium or media sucked up by the device preferably may pass through a cyclone for separation of grinding dust or other particles before the filter apparatus if such one exists.

The described device is easy to apply to existing machines and working places especially as the box 1–3 does not need to be horizontal as shown in the drawings but can be placed in any suitable position in dependence of the position of the distance that shall be point sucked. The length and cross section area of the box easily can be given suitable dimensions as the need will be.

When the described device according to the invention shall serve for supply of fresh air from a stationary place to a moving place the device is mounted for instance according to FIG. 5. A factory plant with the floor area for instance 10×50 meters has alongside its longitudinal walls 35,36 rails for a traverse 37 with a fixed basket or cabin 38 for one or more workers who shall survey the working place thereunder and make some manoeuvres while the traverse 37 is moved to and fro along the whole or the larger part of the length of the building. At that the box 1–3 is fixed to the wall 36 and its tube 5 (not shown) is connected to the open air possibly via a cooling, heating, filtering and/or a moistening device etc. while the pipe 26 on the connection body ends into and is connected with the basket or the cabin 38. A fan is located in the pipe 26 with the suction side directed against the box 1–3 so that fresh air is supplied to the basket or the cabin 38. An adjustable vacuum valve is located in the tube 5 in order to prevent that too low pressure that can suck the tightening band somewhat down in the slot and impair the tightening arises on account of some obstruction of the tube 5. By this, one secures a low overpressure in the cabin if this one is closed and inflow of unhealthy air is prevented.

If the cabin 38 is movable along the traverse 37 a further box similar to the box 1–3 is fastened with its longitudinal direction along the movement way of the cabin, i.e. along the traverse 37, and the further box is connected to the connection body on the box 1–3 and has its own connection body in communication with the cabin.

One of the most important advantages of the described device is that for air intake and fresh air supply at a moving place one does not need the use of movable, long tubes or hoses and thereto the device is simple in manufacturing and easy to mount together and to put up on desired place.

According to the modified embodiment shown in FIGS. 6–10 the box 40 substantially is square in cross section and the edges of the slot 41, FIG. 8, are provided each with its lining 42, for instance of aluminum.

The upper side of the linings 42 forms contact surface 43 for the tightening band 44 that has its ends fastened to the ends of the box 40 and runs under press rollers 45 and over backing rollers 46 at the connection body 47 and its stay plates 47'. The cavity 48 of the body 47 has a drum 49 tightly connected and arranged for the passage of the tightening band 44.

The connection body 47 bears on the contact surfaces 43, FIG. 9, on the linings 42 and its slide shoe 50 extends from the one press roller 45 to the other 45 and through the slot 41 and have rollers 52 against the inside of the upper side of the box 40. In the sides of the slide shoe 50 directed against the linings 42 tightening lists 53, for instance of teflon, are set in and pressed against the linings 42 by means of pressure springs 54 in tubes 55 across the slit 56 in the body 47 and distributed along the slide shoe. Through said slit 56 the intake pipe line 57 from the working place or the like through the cavity 48 communicates with the box 40 and its firm tube 58. Said intake pipe line 57 and the connection body 47 are stayed by means of a trolley 59 running on rails 60 of which a part only is shown.

The embodiment according to FIGS. 6–10 especially has the advantage to give improved tightening conditions at the device.

The invention shall not be considered to be restricted to the described and shown embodiments only, but modifications may be possible withing the scope of the invention. For instance the tightening band can be tensioned by draw springs or by movement of the backing rollers.

What I claim is:

1. A device for transfer of air mixed with gases, vapours, smaller particles etc. or of fresh air in the one or other direction between a stationary place and a moving intake or exhaust place, comprising: an elongated box with walls and fluid communication tube means connected to its interior; said tube means having its other end adapted to be connectable to a stationary inlet or outlet; one wall of said box, in its longitudinal direction, having a longitudinal slot; an elongate tightening band extending along and over said slot in its longitudinal direction; a connection body, with air passage means therethrough, arranged on said box and through the slot for longitudinal movement along said slot with its passage means in continuous fluid communication between the interior and exterior of said box and with an air passage conduit means projecting from said connection body so that the free opening of said conduit means, during movement of the connection body being moved to varying places within an area; portions of said wall adjacent said slot have elongate contact surfaces; said connection body having engagement means bearing on said contact surfaces, disposed on one side of said slotted wall, guided slide shoe means on the opposite side of said slotted wall, and stay plates on said connection body on said one side of the slotted wall; a rotatable press roller supported by said stay plates adjacent each slide shoe means; and backing rollers supported by said connection body; means attaching the ends of said tightening band to the ends of said box with said band passing under the press rollers and over the backing rollers.

2. A device as defined in claim 1, wherein said contact surfaces located on the wall edges defining said slot are provided with a tightening material and an upper portion of the walls of the box extending in the longitudinal direction form a guiding border for receiving said tightening band.

3. A device as defined in claim 1, wherein said conduit means is provided with a manually adjustable check valve.

4. A device as defined in claim 1, wherein a vacuum valve is inserted in the tube means connected to said box.

5. A device as defined in claim 1, wherein tightening lists are mounted on at least a portion of each side of said slide shoe means passing through said slot; said lists bearing against the edges of the slot and pressure springs supported by the slide shoe means engage and bias said tightening lists against the edges of said slot.

6. A device as defined in claim 5, wherein the edges of said slot are each provided with a lining, said linings forming contact surfaces for said tightening lists, said tightening band and said connecting body.

7. A device as defined in claim 5, wherein a trolley is fixed to said conduit means, rails are provided for said trolley and said connection body and said conduit means connected thereto are stayed by means of said trolley guided by said rails.

* * * * *